US005337565A

United States Patent [19]

Meixner

[11] Patent Number: 5,337,565

[45] Date of Patent: Aug. 16, 1994

[54] DEVICE FOR DRIVING A TOOL MOVABLE TO AND FRO IN AXIAL DIRECTION

[75] Inventor: Hans-Werner Meixner, Wettenberg, Fed. Rep. of Germany

[73] Assignee: Pi-Patent Gesellschaft mit beschraenkter Haftung (GmbH), Wettenberg, Fed. Rep. of Germany

[21] Appl. No.: 997,917

[22] Filed: Dec. 29, 1992

Related U.S. Application Data

[63] Continuation-in-part of PCT/EP91/01146, Jun. 20, 1991.

[30] Foreign Application Priority Data

Jun. 29, 1990 [DE] Fed. Rep. of Germany ....... 4020776

[51] Int. Cl.$^5$ ............................ B60T 7/02; F15B 7/08

[52] U.S. Cl. ......................................... 60/594; 60/533

[58] Field of Search ................. 60/533, 538, 539, 542, 60/579, 580, 585, 586, 587, 588, 589, 546, 590, 565, 594, 574, 576; 91/375 R

[56] References Cited

U.S. PATENT DOCUMENTS

| | | | |
|---|---|---|---|
| 2,001,749 | 5/1935 | Sauzedde . | |
| 2,429,390 | 10/1947 | Case . | |
| 2,544,134 | 3/1951 | Clark . | |
| 2,602,434 | 8/1952 | Barnaby . | |
| 2,735,255 | 2/1956 | Harper et al. | 60/590 |
| 3,113,433 | 12/1963 | Kohlman | 60/594 |
| 3,548,594 | 12/1970 | Ceppi . | |
| 3,945,209 | 3/1976 | Dexter | 60/546 |
| 4,112,681 | 9/1978 | Roces | 60/594 X |
| 4,709,912 | 12/1987 | Illig et al. | 60/594 X |
| 4,791,895 | 12/1988 | Tittizer . | |
| 4,823,553 | 4/1989 | Reynolds | 60/533 X |
| 4,876,853 | 10/1989 | Shirai et al. | 60/588 X |
| 5,070,699 | 12/1991 | Leiber et al. | 60/594 X |
| 5,121,686 | 6/1992 | Schonlau et al. | 60/588 X |

FOREIGN PATENT DOCUMENTS

| | | | |
|---|---|---|---|
| 490039 | 1/1976 | Australia . | |
| 0244878 | 1/1986 | European Pat. Off. . | |
| 1086028 | 1/1961 | Fed. Rep. of Germany . | |
| 2205999 | 8/1973 | Fed. Rep. of Germany . | |
| 2251672 | 4/1974 | Fed. Rep. of Germany | 60/594 |
| 3425134 | 1/1985 | Fed. Rep. of Germany . | |
| 3915175 | 11/1989 | Fed. Rep. of Germany . | |
| 2402127 | 3/1979 | France . | |
| 267480 | 3/1950 | Switzerland . | |
| 267482 | 3/1950 | Switzerland . | |
| 936153 | 3/1963 | United Kingdom . | |
| 934942 | 8/1963 | United Kingdom . | |

OTHER PUBLICATIONS

Heinz Zoebl: Ölhydraulik, pp. 127–141, MIT 439 Textabbildungen, Wien, Springer–Verlag, 1963.

*Primary Examiner*—Edward K. Look
*Assistant Examiner*—Hoang Nguyen
*Attorney, Agent, or Firm*—Foley & Lardner

[57] ABSTRACT

A device for driving a tool in axial direction in the course of a vibration-like forward and reverse movement, which operates at high efficiency with a rapidly oscillating stroke frequency and can be used as an easily handled hand-held appliance because, due to the drive, an especially advantageous ratio of the weight and volume to the power exerted at output is feasible. This drive consists of a piston (8) movable non-positively to and fro, which feeds oil to a working piston (22) and moves the latter correspondingly to and fro against the pressure of a spring (25) acting on the working piston (22) and against the external air pressure. The tool to be drive is preferably connected with the working piston (22) by means of the counterpressure spring (25). Working cylinder (20) and master cylinder (9) are connected with each other by a flexible hose (14) to prevent any weight transmission to the hand-held appliance. (FIG. 1)

35 Claims, 3 Drawing Sheets

DEVICE FOR DRIVING A TOOL MOVABLE TO AND FRO IN AXIAL DIRECTION

Figure 1:
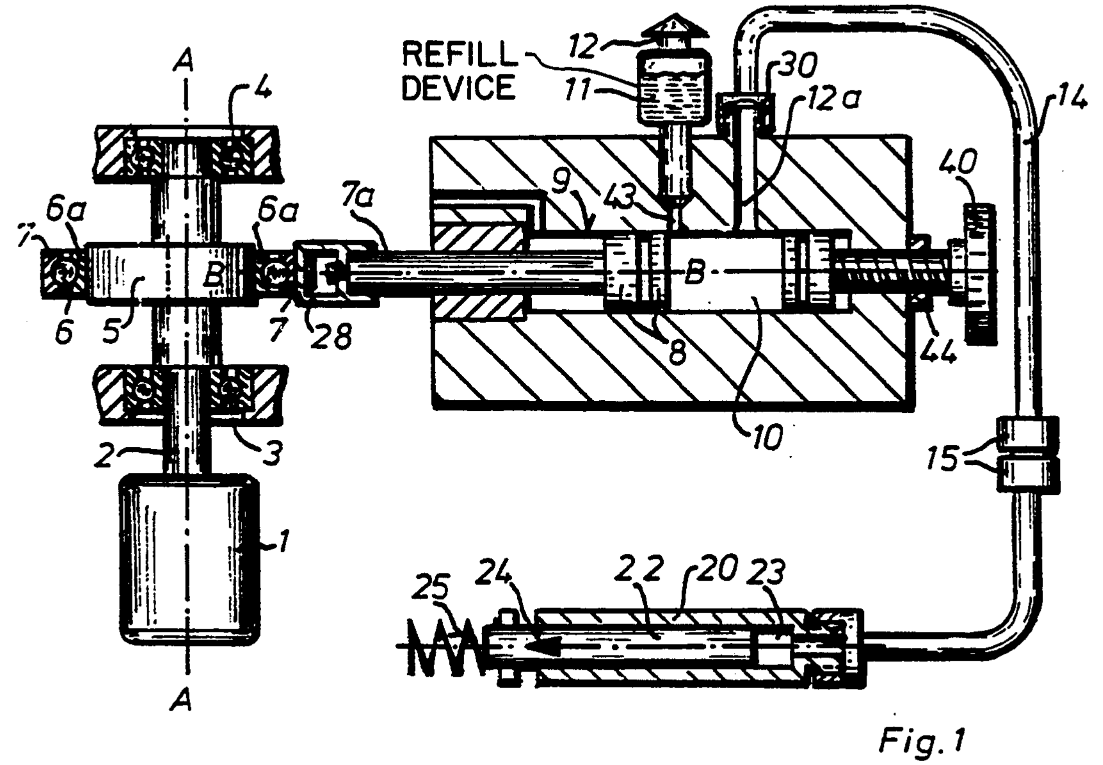

The benefit of the filing date of prior International Application No. PCT/EP91/01146, filed Jun. 20, 1991, is hereby claimed according to 35 U.S.C. §120. This application is a continuation-in-part application of PCT /EP31/01146 filed Jun. 20, 1991.

DESCRIPTION

The invention relates to a device for driving a tool which can be moved to and fro in axial direction.

Such tools and drives are known, for example as pneumatic hammers, pneumatic knives and the like which operate on this principle. These drives cause a great deal of noise even when idling, although only a slight force may be required for the drive. With the known drives, the weight and the volume of the tool in relation to the performance leave much to be desired, and the tool therefore requires the application of great manual force for its operation.

From the FR-A 2 402 127, a telemotor system is known, in which a drive unit moves a piston in a cylinder which acts on an oil column which acts on a piston in a cylinder of a tool and moves for example the blade of a hedge clipper. The master-cylinder piston is returned with contact to the cam plate exerting the force by the springs acting on the piston. As springs work too sluggishly, such drives can be used only for tools with a low stroke frequency. Otherwise disengagements and impacts occur between the piston and the cam plate. In the event of a faster stroke frequency, for example in excess of 12 Hz, the outcome is also gas emissions in the oil. This severely impairs the efficiency of the power transmission between the driving motor and the driven tool. There is moreover a risk of cavitation phenomena occurring in the event of such gas emissions. The efficiency between the drive and output of such a system is relatively poor, as the entire performance of the drive during a working cycle has to be produced in the first half of the full cycle. Moreover, the motor output to be supplied is not distributed linearly in this first half of the working cycle. The fact is rather that it undergoes a proportional increase until the end of the first half of the working cycle and then drops back to almost zero after overcoming this point. For this reason almost no motor output is transmitted in the second half of the full cycle.

Similar systems with the same disadvantages are displayed by AU-A-490,039 and CH-A-267 482.

A cam plate need not necessarily be used as the drive. According to EP-A-0 244 878 the cam plate is replaced by two electromagnets which move a piston to and fro in a cylinder. This acts on two oil columns on either side of it, which drive a working piston for a valve control in motor vehicles in a corresponding manner. The piston is returned in this case by generating a vacuum in one of the oil lines and overpressure in the other oil line. These changes in pressure are executed alternately to actuate the valve. The lag induced in this way is to be improved by means of a restoring spring. If this drive were to be used for fast frequencies, the vacuum occurring would result in gas emissions. These are eliminated according to the prior art by very cost-intensive measures.

It is the object of the invention to provide a drive with a rapidly oscillating stroke frequency and high efficiency between the drive (motor) and the output (tool), which is designed in such a way that the tool is advantageous to handle as a lightweight, hand-held appliance which is small in volume but very powerful.

This object is solved by the characterizing features of claim 1 or claim 2.

Claims 1 and 2 solve simultaneously the following subordinate objects:

a) to create a high driving force with high effiency in the form of an axially oscillating rapid stroke frequency, b) to transmit the driving force to a hand-held appliance without transmitting the weight of the drive to the hand-held appliance, c) to create an exceptionally good ratio between weight and volume and the force to be released at the output, d) to avoid extensively the cavitation obstructing power transmission (gas emissions from the medium).

In addition the solutions according to claims 1 and 2 also permit e) simple replacement of the tool, f) virtually noiseless operation of the drive and also g) vibration-free operation.

Furthermore the drive is h) easy to clean, and it may i) also be serviceable under water.

Subordinate object a) is the precondition for a commercially and economically efficient drive which can be designed in such a way that it operates with maximum efficiency.

Subordinate object b) serves to be able to drive a hand-held appliance in which the weight of the drive is not transmitted to the hand-held appliance, so that the hand-held appliance is not excessively heavy with the required performance, and in conjunction with c) to be able to use the tool for professional purposes too, for example as a boning knife, namely over a longer, uninterrupted working period, without the user (butcher) being fatigued by the weight or poor gripping properties of such a tool (knife).

The drive according to the invention is to have just the reverse effect that the handling of the tool is substantially facilitated.

The solution to subordinate object d) has the effect, because on the one hand cavitations are to be avoided in any hydraulic transmission system and because cavitations would have a performance-reducing effect on the hand-held appliance especially in the case of the drive according to the invention, that these phenomena do not occur.

The solution to subordinate object e) effects a rapid, simple changing operation, for example of the blade of a butcher's knife, because such knives must be frequently reground and the knife with the actual knife drive is not to be withdrawn from the working operation during this time.

The solution to subordinate object f) serves to prevent excessive noise which is disturbing to and in particular detrimental to the health of the user, and the solution to subordinate object.

g) has the effect of reducing to a minimum fatigue-inducing vibrations which are moreover experienced as unpleasant.

The solution to subordinate object h) is expedient because for example a knife has to be cleaned inclusive of the drive and it is advisable for such cleaning to be undertaken by immersion in cleansing fluid (water) while it is running.

The solution to subordinate object i), finally, has the effect that the tool (knife) can also be used under water without the user having to be afraid of receiving an electric shock.

Further features to be drawn from the sub-claims show advantageous developments for solving subordinate objects, such as being able to adjust the stroke frequency, stroke length and power during operation of the tool (knife).

Overall, the drive is the precondition for a rapidly oscillating hand-held appliance with high efficiency, of substantial commercial significance and special user orientation to be able to be created.

If an electric motor is provided for the drive of the piston of the master cylinder, this acts advantageously on at least one eccentric disc, to set the latter into rotation. It is then practical for the eccentric disc to carry on its circumference a ball bearing whose internal shell is connected with the eccentric disc, is shrunk advantageously onto the circumference of the disc, thus rotates with the eccentric disc, and whose external shell is resistant to rotation but can execute a linear motion in such a way that the piston of the master cylinder which is linked with it executes both a forward and a reverse movement forced by the eccentric disc. The piston of the master cylinder can, however, also be linked laterally to the eccentric disc with its piston rod, like a crank. If an electromagnet is provided for the drive, it is locked non-positively with the piston of the master cylinder. A flexible connection between the piston rod and the armature of the electromagnet is not necessary in this case. The piston rod can rather be rigidly connected with the armature of the electromagnet.

The drive according to the invention has the advantage that both the power and the frequency and the stroke of the piston of the working cylinder are easily regulated. The frequency is determined by the speed of the driving motor or the magnet phase. The maximum stroke is predetermined by the configuration of the eccentric disc or by the stroke length of the electromagnet. Exact regulation and lowering of the stroke is possible through the measures described by means of the drawing. The power determines primarily the pressure of the displaced fluid. This power can be regulated by means of a pressure relief valve. The drive is thus extremely versatile in its potential applications. Details on this can be drawn from the sub-claims and the description of embodiments.

A further advantage is that the master cylinder can not only drive the piston of a working cylinder but, through branching of the transmission lines, can act simultaneously on a large number of pistons, each of which drives a tool, As a loss of the transmission agent, hereinafter referred to for the sake of simplicity as oil, frequently occurs in hydraulic drives, an automatic oil refill device with a venting device is provided between the master cylinder and the working cylinder or connected with the working cylinder itself.

It is expedient to provide the connection hoses between the master cylinder and the working cylinder with easily detachable plug-in connectors for the respective required connection, so that one tool with its special drive can easily be replaced by another without any loss of oil.

Each working piston moreover has at least one counterpressure spring which counteracts the oil pressure when the piston is being moved in the master cylinder. Moreover, the external air pressure continues to act on the piston of the working cylinder and reinforces the effect of the counterpressure spring. By this means the oil column between the piston of the master cylinder and the piston of the working cylinder is moved to and fro without the oil ever falling below a predetermined minimum pressure during a working cycle and cavitation phenomena consequently occurring. This measure contributes substantially to permitting a rapidly oscillating frequency of the oil column.

With an adjustable oil pressure (power) and an adjustable stroke length and stroke frequency, an extremely precise fine adjustment for the movement to and fro of the connected tool can moreover be guaranteed. The counterpressure spring can moreover be used for example to connect the tool to the piston of the working cylinder, permitting simple replacement of the tool.

Embodiments of the invention are shown on the drawing, wherein

Figure 2:
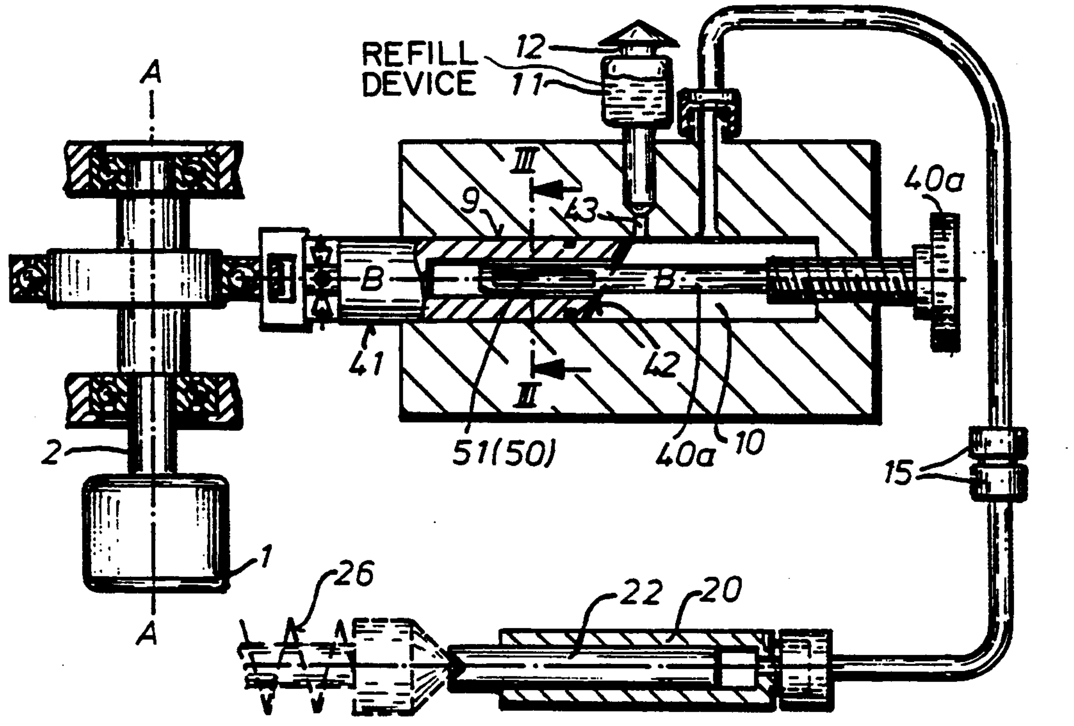
Figure 3:
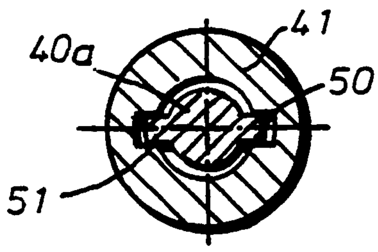
Figure 4:
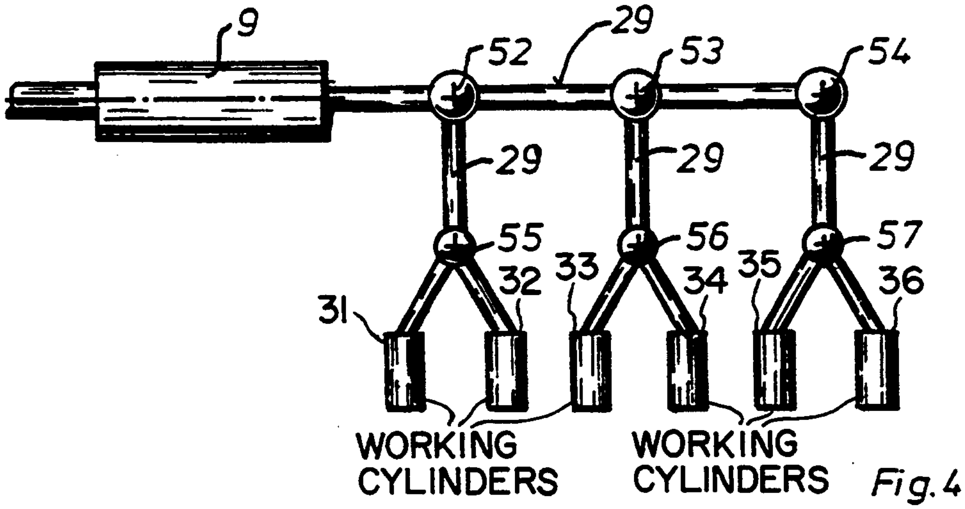
Figure 5:
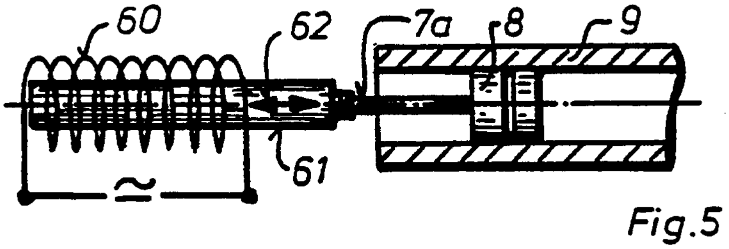
Figure 6:
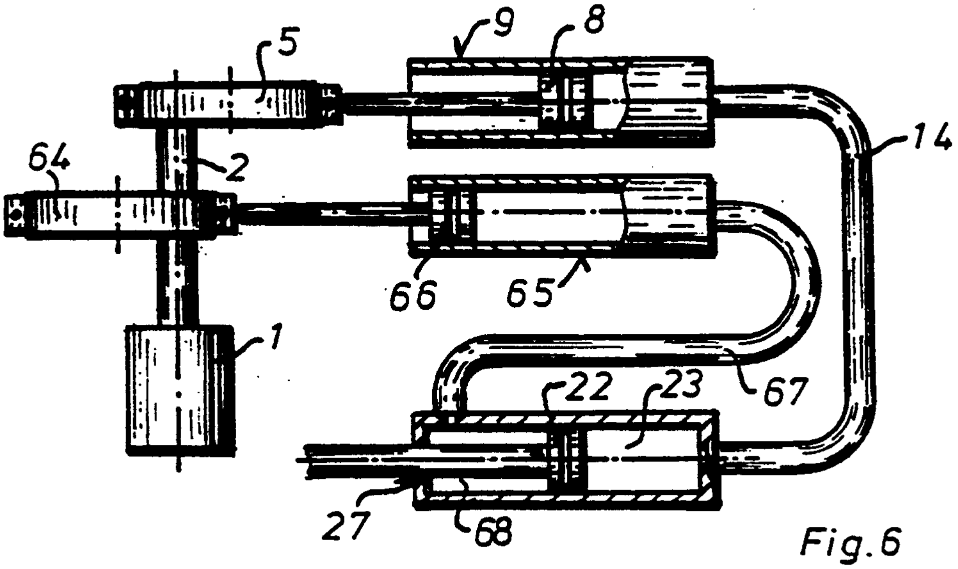
Figure 7:
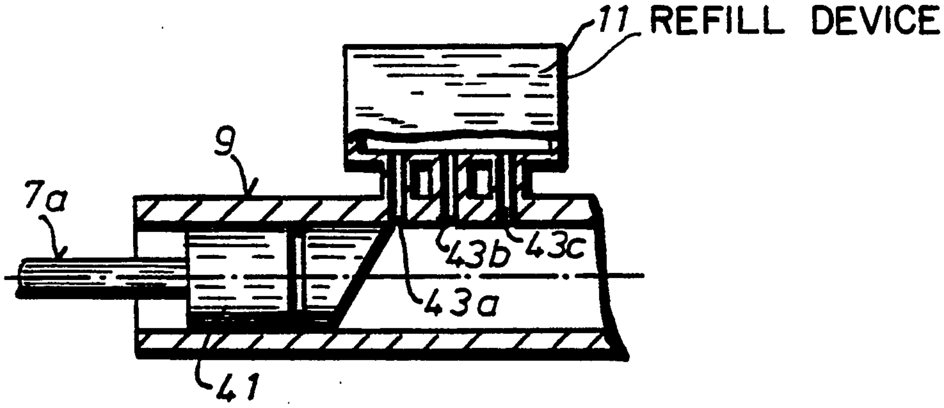
Figure 8:
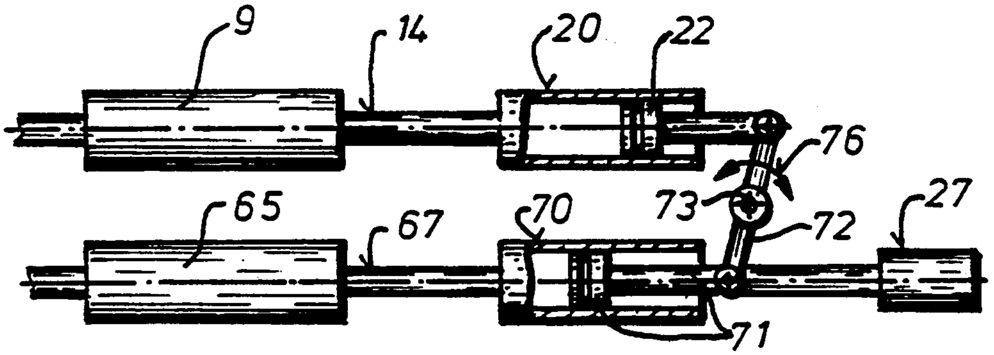
Figure 9:
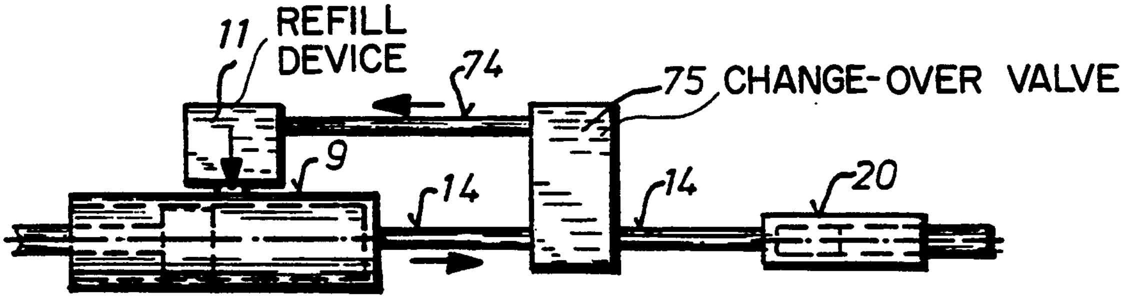

FIG. 1 shows the schematic structure of the system;
FIG. 2 shows a modified embodiment;
FIG. 3 shows a section along line III—III of FIG. 2;
FIG. 4 shows a modified embodiment;
FIG. 5 shows a modified embodiment;
FIG. 6 shows a modified embodiment;
FIG. 7 shows a modified embodiment;
FIG. 8 shows a modified embodiment;
FIG. 9 shows a modified embodiment.

According to FIG. 1, an electric motor 1 is provided which drives a shaft 2 which runs in ball bearings 3, 4. On the shaft 2 an eccentric disc 5 is rigidly mounted, which rotates round the driving axle A—A of the shaft. The eccentric 5 carries a ball bearing 6 whose internal shell **6*a* is shrunk advantageously onto the eccentric disc 5. The balls run between the shell 6*a* and an external shell 7 which cannot be rotated. The shell 7 can, however, be moved to and fro along the line B—B. It is flexibly connected with a piston rod 7*a*. The piston rod 7*a* carries a piston 8 and moves it to and fro in a master cylinder 9**.

In the working area 10 behind the piston 8 there is oil as a transmission agent, which is fed to the working area 10 by means of an automatic oil refill device 11 via a non-return valve (not shown) normally provided as a matter of course and is automatically refilled in the event of an oil loss. The oil refill device 11 moreover has in its lid a bleeding and venting device 12. The working area 10 moreover has a discharge opening **12*a* for the oil. On forward movement of the piston 8 (in FIG. 1 to the right) the oil is pressed via the discharge opening 12*a* into a hose 14. The hose 14 is flexible, but virtually uninfluencable in its cross-section and its longitudinal extension. A medium-pushing screw 40 acts on the cylinder volume to compensate a minimum pressure loss by expanding the hose. The transmission medium oil is fed to a working cylinder 20 on the forward movement of the piston 8. In the line 14 a rapid-action coupling 15 is provided to be able to produce different connections to different tools. The rapid-action coupling is pressure-sensitive and prevents an oil loss when the connection of another tool is replaced. The working cylinder 20 has a piston 22 on which the oil acts on the forward movement of the piston 8 in such a way that the piston 22 moves towards the arrow 24. When the piston 8 in the master cylinder 9** moves back, i.e.

towards the eccentric, the oil pressure in the line 14 is reduced. A vacuum develops in the working area 23 of the cylinder 20 so that the latter moves back, i.e. in FIG. 1 to the right. At the piston 22 the tool to be moved (not shown) is fastened by means of a spring 25. To ensure that the movement of the tool and thus of the piston 22 is carried out at the required speed, the spring acts simultaneously as a counterpressure spring on the working piston 22. By adjusting the pressure in the oil line 14, for example by means of a pressure relief valve, extremely precise regulation of the power of the tool can be effected. The power of the spring must be rated in such a way that it does not obstruct the forward movement of the piston and thus of the tool, but on the other hand guarantees a sufficiently fast return of the piston 22.

The volume of the compressed oil is changed simultaneously by means of an adjusting screw 40*a* so that a larger or smaller quantity of oil is pushed into the line 14 on each forward movement of the piston 8 and stroke regulation is thus feasible.

According to FIG. 2 the piston 8 which is movable to and fro in FIG. 1 is replaced by a piston 41 which has an oblique face 42. With this configuration the piston 41 closes the intake opening 43 for the refill device 11 earlier or later, depending on the inclination of the oblique face. The adjusting screw 40*a* is connected in addition with the piston 41 in such a way that the piston can be rotated round its axle B—B, so that the inclination of the oblique face 42 to the oil intake opening 43 is changed. That means that the intake opening 43 is opened or closed depending on the inclination of the oblique face on a movement to and fro by the piston. According to FIG. 3 the adjusting screw 40*a* has for adjustment of the inclination of the oblique face two cams 50, 51 which are located in corresponding recesses of the piston and twist the latter round the axle B—B on the turning of the screw 40*a*. The adjusting screw is engaged in the required position.

In modified design according to FIG. 7, several intake openings 43*a*, 43*b*, 43*c* can be provided in series, which the piston closes in succession on its movement. In this way the fluid displacement and thus the stroke movement of the working piston 22 can also be regulated in that the adjusting screw now closes one or more of the intake openings in succession. The oblique face of the piston need not be provided for this purpose. In all events, however, one of the provided intake openings must always be opened.

According to FIG. 4 the system is designed simultaneously for more than one working cylinder, for example for working cylinders 31 to 36, as illustrated schematically, in that the connecting lines are branches at points 52 to 57. The mode of operation is the same.

According to FIG. 5 the motor drive of the eccentric disc is replaced by an electromagnet 60 whose core 61 is moved to and fro depending on the current flow towards the arrow 62. The core is connected with the piston 8 of the master cylinder 9. The effect is the same as described in FIG. 1.

FIG. 6 shows an embodiment in which two master cylinders 9 and 65 are provided. The piston 8 of the master cylinder 9 is for its part moved to and fro by the eccentric disc 5. The piston 66 of the master cylinder 65 is driven correspondingly by an eccentric disc 64. The disc 5 is connected with an associated piston 8, 66 in the same way as the disc 64. The eccentric discs 5 and 66 are offset by 180° on the shaft 2 of the electric motor 1, so that when the piston 8 is in the right-hand position in the cylinder, the piston 66 is in the left-hand position of the cylinder 65, i.e. the pistons 8 and 66 are counteracting. The piston 8 pushes oil through the line 14 into the working area 23 of the cylinder 27. The piston 66 pushes oil via the line 67 into the space 68 in front of the piston 22 (complementary working area). The counteracting oil pressure in areas 23 and 68 now pushes the piston 22 forward and back. The spring for the return movement of the piston can thus be eliminated.

FIG. 8 shows a modified embodiment. The master cylinders 9 and 65 of FIG. 6 are connected with two working cylinders 20 and 70 by means of the lines 14 and 67. One line 14, 67 respectively is assigned to one of the working cylinders 20, 70. The pistons 22, 71 of the working cylinders 20, 70 act on a plate 72 or a lever which can be moved to and fro round an axle 73 in the direction of the arrow 76. The plate 72 acts on the tool so that the latter executes the oscillating motion again. This configuration has the advantage over the configuration according to FIG. 6, which has the same effect, that the oil lines on the side facing away from the tool run into the working cylinders.

According to FIG. 9 the working cylinder acts on the working cylinder 20 via the line 14 through insertion of a pressure-sensitive change-over valve 75. From the valve 75 a line 74 goes off as a second path, which runs into the refill device 11. The mode of operation of this device is as follows: When the piston of the cylinder 9 moves to the right, then it pushes the oil which has flowed in from the refill reservoir 11 via the line 14, the now open valve 75 into the cylinder 20 and moves its piston likewise to the right. When the piston in the cylinder 9 moves to the left, a vacuum develops in the line 14. The valve 75 now connects the cylinder 20 with a line 74 which runs into the oil refill reservoir 11. As the piston of the cylinder 9 releases the opening of the oil refill reservoir, the piston draws in from the refill reservoir 11 oil which follows on via the line 74, namely from the working area of the cylinder 20. When the piston 9 moves to the right, the valve 75 changes over so that the connection of the line 14 to the working cylinder is restored. In this configuration the oil is in a circuit and not in an exclusively oscillating motion. This configuration has the advantage that the oil can for example be cooled by flowing through a cooling device. This configuration is furthermore suitable for an exact power setting for the movement of the tool if the pressurization of the valve 75 is selected or set appropriately.

The advantages of the above invention are seen in the following features:

Because the piston 10 of the master cylinder is linked non-positively to the cam plate 5, it is moved to and fro by the driving motor 1 or by the corresponding electromagnet. It accordingly pushes the oil column in the line 14 correspondingly to and fro and thus presses on the one hand on the piston 22 of the working cylinder and on the other hand draws the oil column and thus the piston 22 back again. This reverse movement is supported substantially by the spring 25 acting on the piston 22, and also by the external air pressure acting on the piston 22.

The configuration according to the invention shows the further advantages:

The weight and the volume can be in a thoroughly favourable ratio to the transmitting power on account of the selected drive. If the weight of the working cylinder with piston is about 40 grams with a stroke length of 12 to 13 millimeters and if the piston is moved with a frequency of ten Hertz, then a force of 100 kilograms per stroke is generated, namely by the drive of an electric motor of 750 Watt.

As is also shown by the above numerical example, the drive works with an exceptionally high efficiency. This is due to the performance of the driving motor being transmitted to the piston of the master cylinder by the non-positive transmission of the rotary motion of the motor shaft during one full revolution almost uniformly both as a forward and as a reverse movement.

The drive works almost noiselessly. A dynamic unit can easily be coupled on by the rapid-action coupling 15 in the transmission line 14. The connection is subject to virtually no wear. The coupling permits quick replacement of the tool by another tool. The vibration in the oscillating tool, which is normally transmitted to the tool in conventional systems, for example in a drive with compressed air, is discharged here through the oil-pressure column as a driving agent by the tool, The tool itself is thus almost vibration-free.

Another factor contributing to these advantages is that the actual drive, i.e. the master cylinder unit and the working cylinder unit are connected with each other not rigidly but through a flexible hose, so that the strains and in particular the weight of the master unit is not transmitted to the dynamic unit. Even for maximum power transmissions, only small hose cross-sections are necessary for the transmission line. In the power/-weight example given above, a hose with an external diameter of only five millimeters is necessary. Due to the low weight and the thin flexible feeder hose, outstanding handling properties are possible with any tool, as stated above. As the drive unit is waterproof, it can also be used for equipment running under water or at least being cleaned with fluid. The entire system is almost maintenance-free and has a very long service life. The system is easy to produce. The production costs are low, namely substantially below those of a pneumatic system or the like in the same performance rating.

The dynamic unit is not connected direct with electric current, so that underwater operation is also feasible. Even with high power transmission the working cylinder, which is connected direct with the tool, is still always very small.

A further advantage is that the stroke frequency, the stroke length and the power of the tool unit can be regulated continuously and independently of each other even during operation.

For simple applications any fluid can be used as a transmission agent.

I claim:

1. A device for driving a tool to and fro in an axial direction, wherein a piston which is moveable to and fro, and which displaces or draws in a fluid medium which actuates a working-cylinder piston (22) in a working cylinder (20), is provided in a master cylinder, wherein the piston (8) of the master cylinder (9) is linked with minimum friction to an eccentric disc (5) so that the eccentric disc moves the piston (8) forward and back, the master cylinder (9) is separated spatially from the working cylinder (20) to prevent any weight transmission, the master cylinder (9) and the working cylinder (20) are connected with each other by a flexible hose (29) or pipeline, the working-cylinder piston (22) of the working cylinder (20) is under the influence of at least one counterpressure spring (26), external air pressure contributes towards supporting a return of the working-cylinder piston (22), and wherein a ball bearing (6) whose internal ring (6*a*) rotates with the eccentric disc (5) and whose external ring (7) is unrotatable but flexibly coupled in a manner permitting linear motion to and fro with the piston (8) of the master cylinder (9) is provided on an external diameter of the eccentric disc (5).

2. Device according to claim 1, characterized in that the tool (27) is coupled to the working-cylinder piston (22) with an aid of the counterpressure spring (26).

3. Device according to claim 1, characterized in that the fluid medium used executes an oscillating movement to and fro on movement of the tool.

4. Device according to claim 1, characterized by a configuration as a self-contained system operating with vacuum and overpressure.

5. Device according to claim 1, characterized in that the piston (8) of the master cylinder (9) is linked laterally to the eccentric disc (5) with a piston rod (7*a*).

6. Device according to claim 1, characterized in that the external ring is connected by a joint piece (28) with a piston rod (7*a*) of the piston (8) of the master cylinder (9).

7. Device according to claim 1, characterized in that the eccentric disc (5) is connected with a driving motor whose speed is adjustable.

8. Device according to claim 1, wherein the piston (8) of the master cylinder (9) is connected with a core (61) of an electromagnet (60) so that the electromagnet moves the piston (8) forwards and back, characterized in that a stroke length of the core (61) of the electromagnet is adjustable.

9. Device according to claim 1, characterized in that a stroke frequency of a tool unit can be adjusted by control led phasing of an electromagnet.

10. Device according to claim 1, characterized in that a switch provided on the tool unit (20, 22, 26, 27) switches a respectively selected drive, including one of a motor drive and an electromagnetic drive, on and off.

11. Device according to claim 10, characterized in that the switch is connected electrically by a cable with a driving unit (1, 60) .

12. Device according to claim 11, characterized in that the cable is incorporated into the hose (14) or pipeline.

13. Device according to claim 1, characterized in that a switch is provided on a tool unit for stroke frequency adjustment, including one of motor speed variation, and electromagnetic phase variation.

14. Device according to claim 13, characterized in that a dimmer is provided as the switch.

15. Device according to claim 1, characterized in that the device has an automatic refill device (11) to compensate a loss of fluid operating medium and to fill up a system.

16. Device according to claim 1, characterized in that the device has an automatic bleeding and venting device (12) for the fluid medium.

17. Device according to claim 1, characterized in that at least one of the master cylinder (9) and the working cylinder (20) has an adjusting screw (40) penetrating a working area of the master cylinder to compensate pressure losses due to a volume of the hose (29) being changed.

18. Device according to claim 1, characterized in that an intake opening (43) of an automatic refill device (11)

for the fluid medium in the master cylinder (9) is designed as a longitudinal slot or in the form of several bores (43*a*, 43*b*, 43*c*) in series in cylinder direction so that, depending on a position of the piston (8, 41), the latter closes one or more of the bores or the longitudinal slot earlier or later along its working path.

19. Device according to claim 18, characterized in that the intake opening bores (43*a*, 43*b*, 43*c*) in a cylinder wall of the master cylinder (9) can be shut off in succession except for at least one which is shut off by an engagable adjusting screw.

20. Device according to claim 1, characterized in that the hose (14) between the master cylinder (9) and the working cylinder (20) is flexible but is almost unexpandable in cross-section and length.

21. Device according to claim 20, characterized in that the hose (14) is of spiral design.

22. Device according to claim 1, characterized in that the master cylinder (9) acts simultaneously on more than one working cylinder (31 to 36) by branched pressure lines (29).

23. Device according to claim 1, characterized in that a pressure line (14) between the master cylinder (9) and an assigned working cylinder (20) is detachable and connectable by an automatically closing rapid-action coupling (15).

24. Device according to claim 23, characterized in that the coupling is provided in proximity to the working cylinder (20).

25. Device according to claim 23, characterized in that one part (29) of the hose (14) is connected with a tool unit.

26. Device according to claim 1, characterized in that the driving motor (1) acts on more than one eccentric disc (5, 64) and each eccentric disc is assigned to a master cylinder with at least one working cylinder.

27. Device according to claim 1, characterized in that the master cylinder (9) is connected via a pressure-sensitive change-over valve (75) with the working piston (22) by means of a first line (14), and a second line (74) leads back from the change-over valve (75) via an oil refill device (11) to the master cylinder (9) in such a way that on the forward movement of the piston (8) of the master cylinder (9) oil is pushed into the working cylinder (10) through the line (14) and on the reverse movement of the piston (8) of the master cylinder (9) the change-over valve (75) makes the oil flow back through the line (74) to the refill device (11) due to the pressure of the working-cylinder piston (22).

28. Device according to claim 1, characterized in that the piston (22) in the working cylinder (20) assigned to it is under the influence of at least one spring (25) exerting a counterpressure on the piston (22) depending on size and pressure.

29. Device according to claim 1, characterized in that the fluid medium used is a hydraulic oil.

30. Device according to claim 29, characterized in that the fluid medium is a food-compatible hydraulic oil.

31. Device according to claim 1, characterized in that the fluid medium used is a gas liquefied under pressure and corresponding temperature.

32. Device according to claim 1, characterized in that a unit, comprising working cylinder (20) with hose (14), is so impervious to an external environment that the unit can operate in fluids including under water.

33. Device according to claim 1, characterized in that an adjustable pressure relief valve, which causes the pressurized fluid medium to overflow from a predetermined pressure onwards into a reservoir of a refill system (11) for power regulation, is provided for regulation of a piston force in the system.

34. Device according to claim 1, characterized in that a natural resonance of the counterpressure spring (26) is tuned to the work of the working cylinder for minimization or for prevention of vibrations.

35. Device for driving a tool to and fro in an axial direction, wherein a piston which is moveable to and fro, and which displaces or draws in a fluid medium which actuates a working-cylinder piston (22) in a working cylinder (20), is provided in a master cylinder, wherein the piston (8) of the master cylinder (9) is connected with a core (61) of an electromagnet (60) so that the electromagnet moves the piston (8) forwards and back, the master cylinder (9) is separated spatially from the working cylinder (20) to prevent any weight transmission, the master cylinder (9) and the working cylinder (20) are connected with each other by one single flexible hose (29) or pipeline, the working-cylinder piston (22) Of the working cylinder (20) is under the influence of at least one counter pressure spring (26), and external air pressure contributes towards supporting a return of the working-cylinder piston (22);

characterized in that a face end of the piston (41) of the master cylinder (9) is designed as an oblique face (42) in the direction of movement of the piston and an effective inclination of the oblique face (42) of the piston (41) can be adjusted around its axle and engaged by turning the piston (41).

* * * * *